United States Patent
Hu et al.

(10) Patent No.: US 10,051,069 B2
(45) Date of Patent: Aug. 14, 2018

(54) ACTION BASED TRUST MODELING

(71) Applicant: International Business Machines Corporation, Armonk, NY (US)

(72) Inventors: Mengdie Hu, Atlanta, GA (US); Jalal U. Mahmud, San Jose, CA (US); Aditya Pal, San Jose, CA (US); Huahai Yang, San Jose, CA (US); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 14/554,092

(22) Filed: Nov. 26, 2014

(65) Prior Publication Data

US 2016/0150037 A1    May 26, 2016

(51) Int. Cl.
| | | |
|---|---|---|
| *G06F 15/16* | (2006.01) | |
| *H04L 29/08* | (2006.01) | |
| *G06F 21/55* | (2013.01) | |
| *G06F 21/57* | (2013.01) | |
| *H04L 12/58* | (2006.01) | |

(52) U.S. Cl.
CPC .......... *H04L 67/22* (2013.01); *G06F 21/554* (2013.01); *G06F 21/57* (2013.01); *H04L 51/32* (2013.01); *G06F 2221/2145* (2013.01); *H04L 67/306* (2013.01)

(58) Field of Classification Search
CPC ....... H04L 67/22; H04L 51/32; H04L 67/306; G06F 21/554; G06F 21/57; G06F 2221/2145

USPC ................. 709/203, 204, 201, 205
See application file for complete search history.

(56) References Cited

U.S. PATENT DOCUMENTS

| | | | |
|---|---|---|---|
| 2006/0064322 A1* | 3/2006 | Mascarenhas | G06Q 30/02 705/2 |
| 2006/0085419 A1* | 4/2006 | Rosen | G06F 17/3087 |
| 2007/0033084 A1* | 2/2007 | Mascarenhas | G06F 17/30011 705/7.33 |
| 2007/0087756 A1* | 4/2007 | Hoffberg | G06Q 10/0631 455/450 |
| 2009/0254971 A1* | 10/2009 | Herz | G06Q 10/10 726/1 |
| 2009/0319344 A1* | 12/2009 | Tepper | G06Q 10/06393 705/7.39 |

(Continued)

OTHER PUBLICATIONS

Bae et al., Good Samaritans on Social Network Services: Effects of Shared Context Information on Social Supports for Strangers, International Journal of Human-Computer Studies, 2013, Abstract Only.

(Continued)

*Primary Examiner* — Thu Ha Nguyen
(74) *Attorney, Agent, or Firm* — Lieberman & Brandsdorfer, LLC (57) ABSTRACT

Embodiments of the invention relate to assessing characteristics of a message and a message recipient. A trust model is established to take into account a set of trust antecedents, including characteristics of the messages and properties of the recipients, a set of action motivations, and their contribution to the action-based trust measurement. The assessment(s) is utilized to produce a tangible trust measurement that is employed to gauge the recipient's perception of credibility towards the received message.

19 Claims, 7 Drawing Sheets

(56) References Cited

U.S. PATENT DOCUMENTS

| | | | | |
|---|---|---|---|---|
| 2010/0317420 | A1* | 12/2010 | Hoffberg | G06Q 30/0207 463/1 |
| 2011/0276310 | A1* | 11/2011 | Schlicht | G06Q 99/00 702/181 |
| 2012/0041801 | A1* | 2/2012 | Mascarenhas | G06F 17/30011 705/7.32 |
| 2012/0239593 | A1* | 9/2012 | von der Borch | G06Q 40/025 705/36 R |
| 2013/0067333 | A1 | 3/2013 | Brenneman | |
| 2013/0101970 | A1* | 4/2013 | Mascarenhas | G09B 19/00 434/236 |
| 2013/0185189 | A1* | 7/2013 | Stewart | G06Q 40/02 705/38 |
| 2013/0305282 | A1 | 11/2013 | Fleischman | |
| 2014/0237599 | A1* | 8/2014 | Gertner | H04L 63/145 726/24 |
| 2016/0042277 | A1* | 2/2016 | Yu | H04L 67/22 706/46 |
| 2016/0225278 | A1* | 8/2016 | Leddy | G06Q 20/10 |
| 2016/0253710 | A1* | 9/2016 | Publicover | H04W 4/21 705/14.66 |
| 2017/0124645 | A1* | 5/2017 | Kortina | G06Q 40/025 |
| 2017/0140141 | A1* | 5/2017 | Yan | G06F 21/32 |
| 2017/0323211 | A1* | 11/2017 | Bencke | G06N 5/04 |
| 2017/0323233 | A1* | 11/2017 | Bencke | G06Q 10/0633 |

OTHER PUBLICATIONS

Cao et al., Understanding the Influence of Social Media in the Workplace: An Integration of Media Synchronicity and Social Capital Theories, 45th Hawaii International Conference on System Sciences, 2012, p. 3938-3947.

Kang, Measuring Social Media Credibility: A Study on a Measure of Blog Credibility, Institute for Public Relations, 2010, p. 1-31.

Mantymaki et al., Trust, Social Presence and Customer Loyalty in Social Virtual Worlds, 23rd Bled eConference eTrust: Implications for the Individual, Enterprises and Society, 2010, p. 49-64.

Wiertz et al., Beyond the Call of Duty: Why Customers Contribute to Firm-Hosted Commercial Online Communities, Organization Studies, 2007, p. 347-376.

Jarvenpaa, S. L. et al., Is Anybody Out There? Antecedents of Trust in Global Virtual Teams, Journal of Management Information Systems; 4, 4, Spring 1998, p. 29-63.

Mayer, R.C., et al., An Integrative Model of Organization Trust, Academy of Management Review, 20(3), 1995, pg.

* cited by examiner

ACTION BASED TRUST MODELING

BACKGROUND

The present invention relates to measuring trust in response to, or associated with, receipt of a message. More specifically, the invention relates to assessing factors associated with the message and producing a tangible prediction measurement reflective of a trust measurement for the message.

With the emergence of social media, unprecedented speed and reach has been attained in the creation and dissemination of information. Social media on many levels replaces or has replaced traditional sources, such as newspaper and radio. As a result social media has developed into an increasingly important channel to engage and influence people.

Social media has become commonplace for information campaigns. Current research focuses on how an individual perceives the credibility of received messages in terms of an expressed trust antecedent, such as competence, benevolence, and integrity. Attention is on the trustworthiness of the messages, which includes characteristics of the messages and that of their creators or senders. However, the trust employed therein does not account for underpinnings of trust, and therefore, takes a simplistic, one-dimensional, and therefore limited view of trust.

SUMMARY

The invention includes a method, computer program product, and system for computing an action propensity of a message recipient.

A method, computer program product, and system are provided for computing a trust measurement associated with a message, which is correlated to predicting action propensity. There are two initial computations associated with the message, including a trust antecedent, and a recipient antecedent. The computed trust antecedent and recipient antecedent are combined to predict credibility towards the message. In addition, at least one motivator from one or more message recipients is computed. By combining the predicted credibility with the motivator(s), a prediction measurement is produced. The prediction measurement functions as a trust measurement for the message.

These and other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings reference herein form a part of the specification. Features shown in the drawings are meant as illustrative of only some embodiments of the invention, and not of all embodiments of the invention unless otherwise explicitly indicated.

The invention and its advantages and benefits are further explained in the detailed description of the invention herein below.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Trust is a firm belief in the reliability, truth, ability, or strength of someone or something. Trust is a complex process that includes not only perception of credibility, but also a process of decision making and action planning. In order to place a measurement on trust, it must be defined and it must include the potential to take action(s) that have realistic consequences. More specifically, the measure of trust must gauge one's level of trust in terms of the willingness to be vulnerable. Accordingly, trust, as defined herein, is quantified by measuring willingness to perform one or more relevant actions in response to receipt of a communication.

Figure 1:
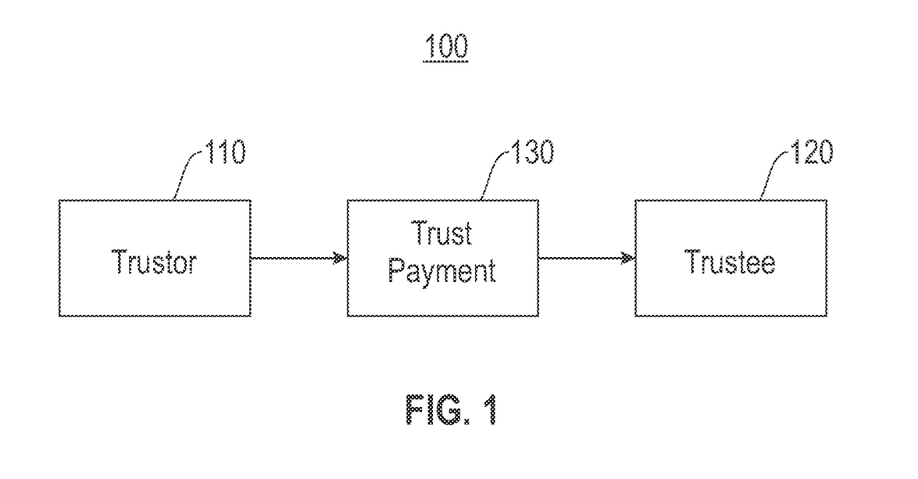
FIG. 1 depicts a block diagram illustrating a trustee initiated trust relationship.

As used herein, the term trust investigates the propensity of taking actions as advocated by the message. With reference to FIG. 1, a block diagram (100) is provided illustrating a trustee initiated trust relationship. Trust involves a context sensitive social relationship that includes multiple components. As disclosed herein, the trust relationship is defined as an implicit and informal social contract that involves at least two parties, a trustor (110) and a trustee (120). The trustor (110) is a person who gives out a trust payment (130). The trust payment (130) may be in the form of performing supporting actions, providing materials, offering emotional attachment, or giving up an item of value, any of which creates vulnerability in the trust relationship. In the context of information campaigns in social media, the trustor (110)

is the recipient of the social media message. The trust payment (130) is the action that the recipient takes in response to the message and it benefits the sender of the message. For example, one person may risk their reputation to endorse information that he/she trusts, while another person may make a financial contribution to further a trusted cause.

The trustee (120) is the entity that accepts the trust payment (130), and is expected to act in a certain way in return. In one embodiment, the trustee (120) is expected to be truthful in response to their acceptance of the trust payment. Expected behaviors or outcome of the behaviors is part of the trust reward of the trustor (110) gained from the trust relationship. The trustee (120) is not limited to a specific individual or group. In one embodiment, the trustee (120) may be in the form of a social institution or a third party authority. In a social media information campaign, the creator or sender of a message is the trustee (120). If the trustee (120) does not act in an expected manner, the trustor (110) may withdraw the trust payment (130). Accordingly, the trustee (120) invests into the trust relationship with reputation or other loss potential(s).

There are two forms of trustor-trustee relationships, each depending on which party initiates the relationship. In the case of a trustor-initiated relationship, the trustor gives an overt instruction on an expected behavior of the trustee. In the cases of a trustee-initiated relationship, the trustee seeds the relationship by sending an offer of the relationship to one or more potential trustors, and the recipients of the offer decides to accept or reject the offer of the trust relationship. In one embodiment, the expected behavior from the trustee is not explicitly mentioned in the message. The potential trustor has to use their judgment on both payment and reward of the trust relationship.

As referenced in FIG. 1, trust is an abstraction that requires definition. Trust is defined as the willingness of the trustor to make a trust payment in a trust relationship. The trust payment is not limited to a monetary exchange. In the context of an information campaign utilizing social media, trust is defined as the willingness of the trustor to take actions that benefit the trustee. In one embodiment, this may be formalized through designating a 'like' to a message, spreading the message, etc. In a research setting, the willingness of a participant to take an action can be obtained from a survey. Similarly, in an application setting, the willingness may be approximated by a statistical likelihood of a user to take an action. Accordingly, as shown herein, in one embodiment, the definition of trust includes a probabilistic behavior assessment.

The same social media message may have a plurality of different actions considered as its trust payment. The different actions may not be equal indicators of trust towards the message. A default value of an action is defined as a quantity that is inversely proportional to the percentage of people who are willing to take the action. In one embodiment, one or more values may manually be assigned to an action. If everyone is willing to take an action, the action means nothing with respect to an indication of trust. However, if a subset of people is willing to take an action, the willingness is a valuable indicator of trust.

Figure 2:
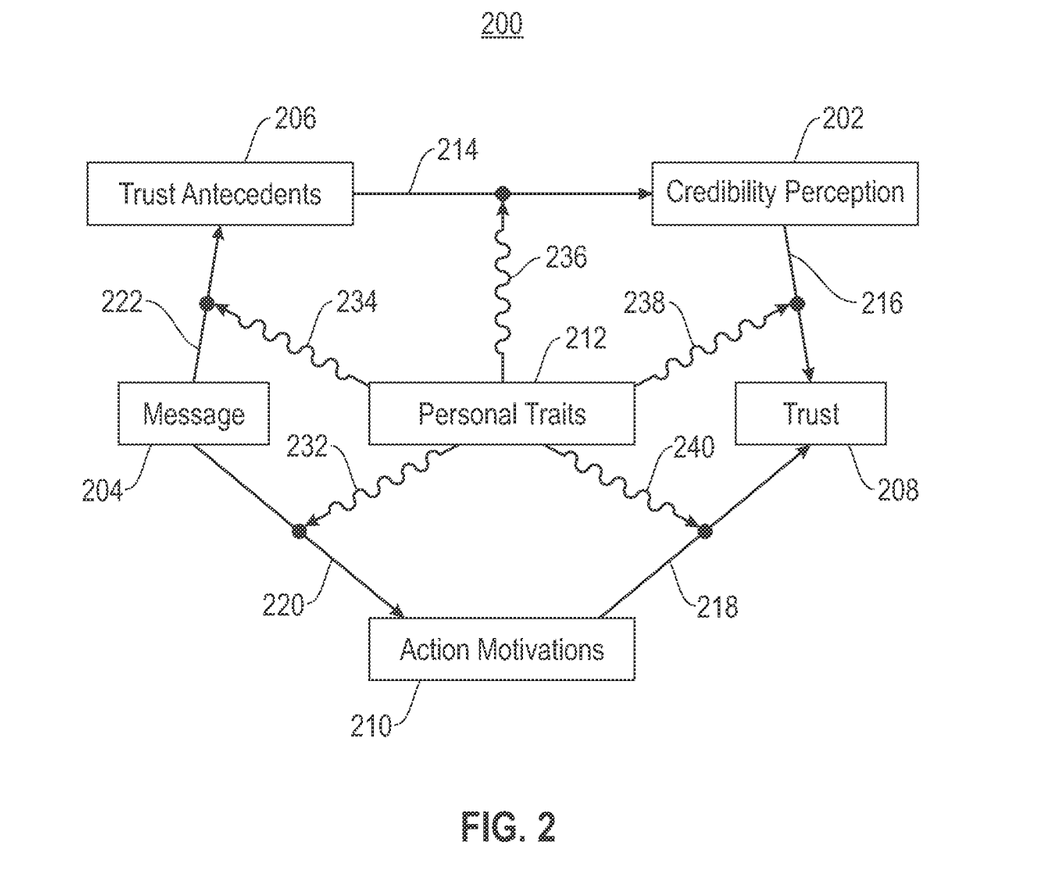
FIG. 2 depicts a block diagram illustrating a conceptualization of a relationship between trust and contributing factors.

Referring to FIG. 2, a block diagram (200) is provided illustrating a schematic view of a conceptualization of a relationship between trust and contributing factors. A single arrow represents a significant determining effect, and a wavy arrow represents a modulating effect. Credibility perception (202) is a significant contributing factor to the model of trust. Actions are often derived by perception or feelings. If a person does not consider the communication credible, they are less willing to take any actions in support of the message (204). The feeling of credibility is determined by one or more trust antecedents (206). In one embodiment, the trust antecedent is about the properties of the message recipient(s), also referred to as trustor oriented antecedents. Similarly, in one embodiment, two different messages may induce different sets of trust antecedents in a message recipient. The measure of trust (208) is action oriented. Different messages may induce different action motivations (210) in a message recipient. For example, in one embodiment, the action may be based on a habit. Similarly, in one embodiment, the action may be based on a cost and benefit analysis. In addition, and as shown herein, an individual recipient's intrinsic personal traits (212) may play a modulating role in each of the factors of the relationship as shown at (232), (234), (236), (238), and (240). For example, a personality trait of agreeableness may be relevant to influence trust propensity. In one embodiment, an agreeable recipient may perceive a message to be more credible than a non-agreeable recipient. Similarly, an agreeable recipient may be more willing to act according to the terms of the message. As shown herein, the message (204), trust antecedents (206), credibility perception (202), trust (208), and action motivation (210) are considered major contributors with a significant determining effect as shown at (214), (216), (218), (220), and (222). Accordingly, as shown herein, a plurality of factors interact to formulate the relationship between trust and contributing factors.

A mathematical value may be placed on the level of trust toward a message. More specifically, the following formula may be employed to calculate the value on the level of trust:

$$Trust = \frac{\sum_{i=1}^{n} WillingToAct_i \times ValueOfAction_i}{\sum_{i=1}^{n} ValueOfAction_i}$$

As shown, herein, trust is expressed as the weighted average of the willingness to take action(s) in support of a message, weighted by the values of the actions, and normalized by the total values of all actions. The variable n represents the total number of actions in support of the message. The variable, WillingToAct, represents the willingness to perform the identified action. The WillingToAct variable may be quantified through use of survey sampling actions, or measurement of actions. The variable, ValueOfAction, may be assessed as a measure of a population's probability to take an action. The variable ValueOfAction is calculated as follows:

$$ValueOfAction_i = \log \frac{1}{P(WillingToAct_i)}$$

P(WillingToAct) is the probability of willing to act on a specific action. In one embodiment, the variable, ValueOfAction can have a specified value or a default value. Accordingly, trust level is defined as a weighted average of willingness to take actions, where willingness to take a certain action is modeled by credibility perception, behavior habits, and personal traits, and value of action is measured by the amount or rarity of the action.

Figure 3:
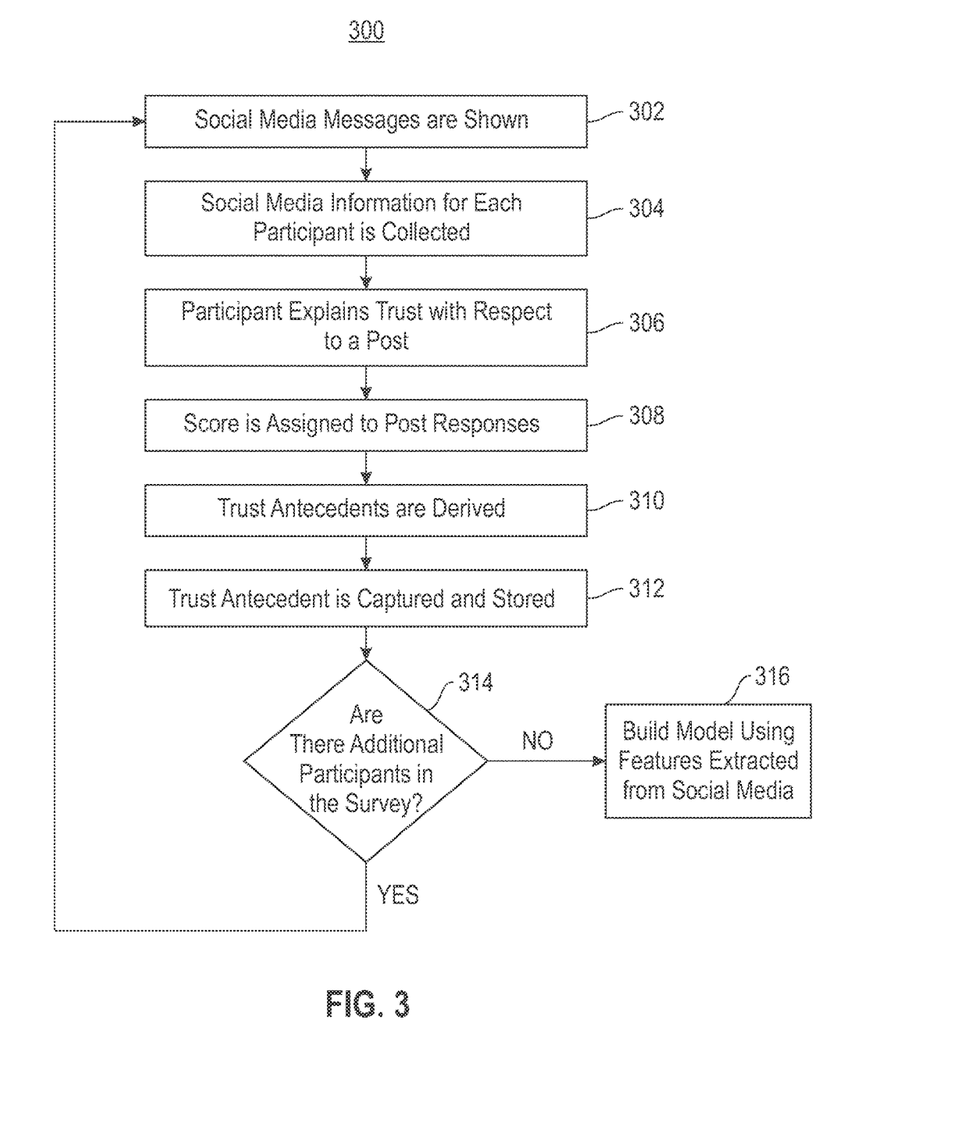
FIG. 3 depicts a flow chart illustrating an example process for acquiring data to obtain a trust level, also referred to herein as obtaining training data.

Referring to FIG. 3, a flow chart (300) is provided illustrating an example process for acquiring data to obtain a trust level, also referred to herein as obtaining training data. As shown, social media messages are shown to participants (302). Social media information associated with each participant is collected (304). A scale is provided to score credibility of the collected responses to facilitate measurement of responses. More specifically, each participant is asked to assign or explain trust with respect to a post (306), and a score is assigned to the post response to measure credibility perception (308). In one embodiment, the following scores are employed:

TABLE 1

| 1 | 2 | 3 | 4 | 5 | 6 | 7 |
|---|---|---|---|---|---|---|
| No | Skeptical | Unsure | Slightly | Partially | Probably | Yes |

However, the quantity of scores and their respective numerical assignments should not be considered limiting. Following step (308), trust antecedents are derived (310) to capture the reasons cited for trust or distrust. In one embodiment, the trust antecedent is trustor oriented or trustee oriented. In one embodiment, the following table, Table 2, demonstrates identified trust antecedents:

TABLE 2

| Antecedent | Focus |
|---|---|
| Prior Knowledge | Trustor |
| Message Source | Trustee |
| Feeling | Trustor |
| Authority Evidence | Trustee |
| Inference | Trustor |
| Personal Experience | Trustor |
| Message Depth | Trustee |
| Message Scope | Trustee |
| Social Cues | Trustee |
| Message Form | Trustee |
| Informal Anecdote | Trustee |

In one embodiment the emphasis of trust originates with a characteristic of the recipients. The trust antecedent is captured and stored (312). It is then determined if there are additional participants in the survey (314). A positive response to the determination at step (314) returns to step (302), and a negative response concludes the data gathering aspect, and proceeds to build one or more models using features extracted from social media (316). The built models may be employed to predict a future participant's level of trust.

Figure 4:
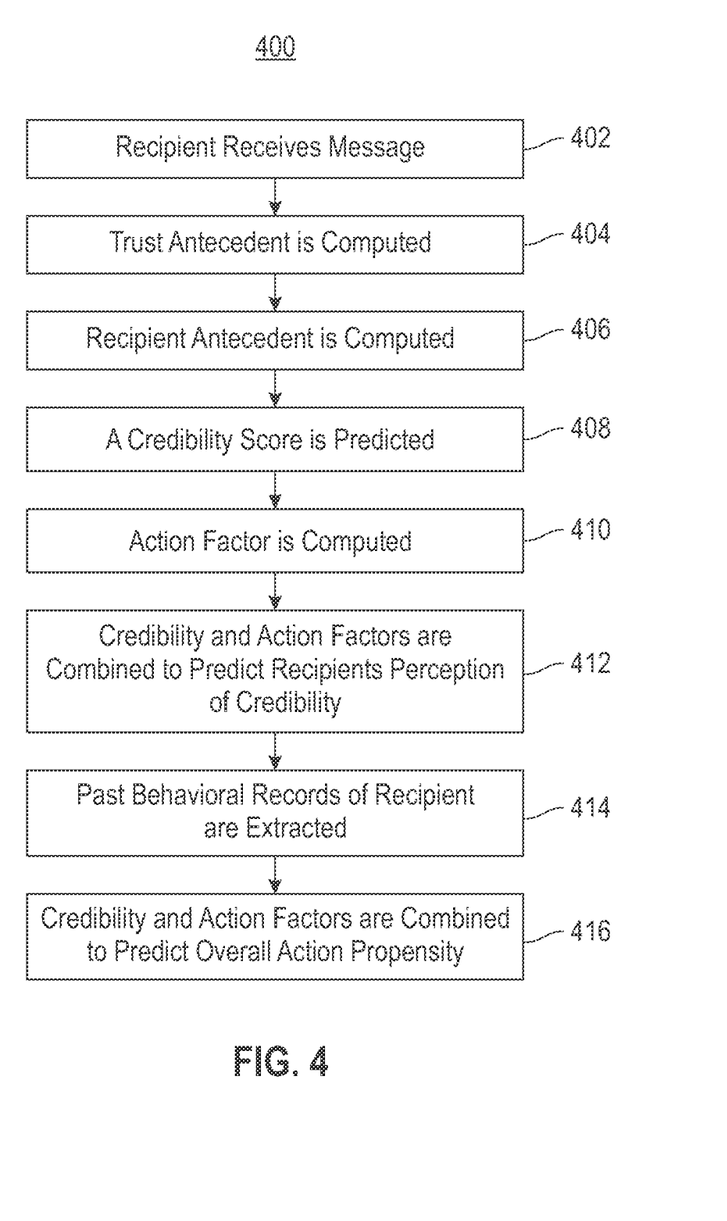
FIG. 4 depicts a flow chart illustrating a process for computing a message recipient's action propensity.

Referring to FIG. 4, a flow chart (400) is provided illustrating a process for computing a message recipient's action propensity. As shown, a recipient is in receipt of a message (402), a trust antecedent is computed based on the received message (404). In one embodiment, the trust antecedent includes, but is not limited to, prior knowledge, message source, feeling, authority evidence, inference, personal experience, message depth, message scope, social cues, message form, and informal anecdote. Examples of trust antecedents are shown and described above in Table 1. Similarly, in one embodiment, a numerical value is assigned to each respective trust antecedent. Following step (404), a recipient antecedent is computed from available recipient information (406). In one embodiment, the recipient information is gathered from social media, and may include prior knowledge on a specific subject, and/or influence(s) from their social circle. A credibility score for the perception of the recipient towards the message is predicted (408). In one embodiment, the credibility score is a combination of the trust antecedent and recipient antecedent. Following step (408) an action factor is computed from the message recipient (410). The following table, table 3, is an example of action factors:

TABLE 3

| Motivation | Example Response |
|---|---|
| Trust | I would not be throwing money away on something I don't believe in. |
| Habit | I don't share much on my social networks at all. |
| Benefit | It seems like something that is very useful and interesting so I would share it. |
| Cost | Terribly written. I would be embarrassed for my friends to see this and think I thought this way. |

The action factor computation at step (410) may include computation of the recipient's past behavioral records related to the message, and thinking style regarding cost and benefit of their action, which in one embodiment is extracted from available recipient information. Following the computation at step (410), the perception of credibility and the action factors, also referred to herein as motivators, are combined to predict the recipient's perception of credibility towards the message (412). In one embodiment, the action propensity is defined as a sum of the willingness to take one or more available actions advocated by the message and weighted by the importance of the actions. In addition, the past behavioral records of the recipient as related to the message, as well as their thinking style regarding cost and benefit of their actions, are extracted from information available about the recipient (414). Thereafter, the perception of credibility and the action factors are combined to predict the overall action propensity (416). In one embodiment, the combination at step (416) is an evaluation of the sum of the available actions advocated by the message, weighted by the importance of the actions. Similarly, in one embodiment, if the importance of the actions is not pre-assigned, a default is determined by a likelihood of occurrence. Accordingly, the level of trust is gauged by measuring willingness to perform relevant actions.

Figure 5:
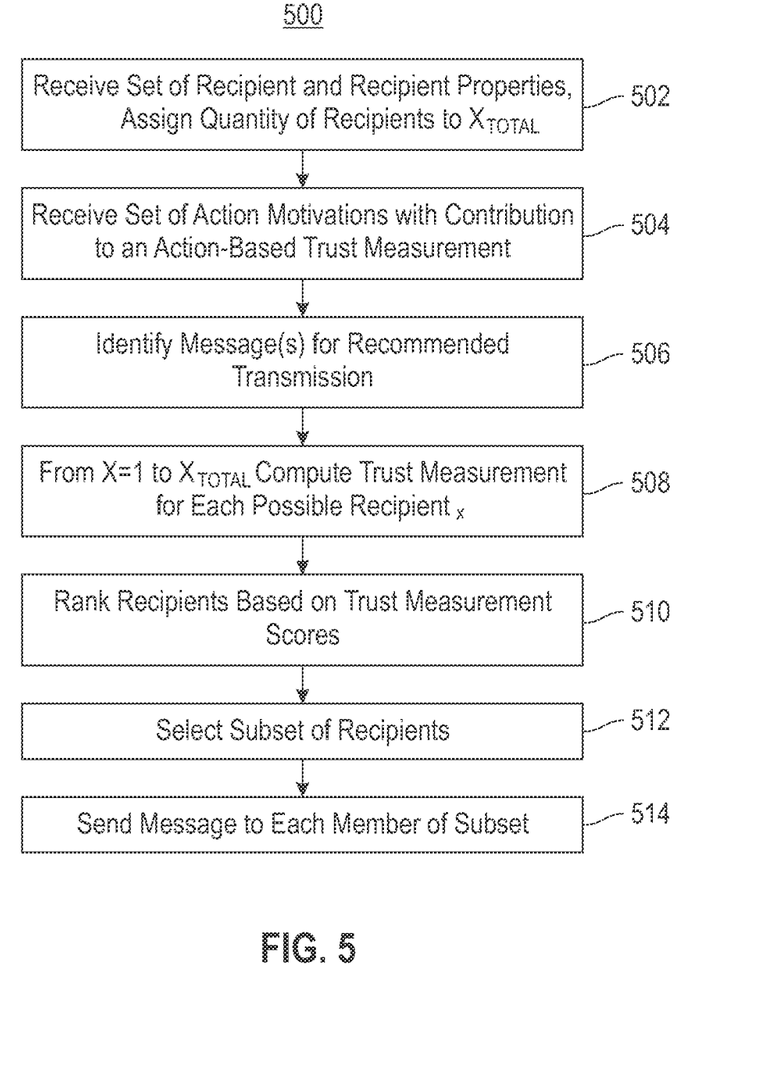
FIG. 5 depicts a flow chart illustrating a process for advocating a recommendation based on a trust evaluation.

Referring to FIG. 5, a flow chart (500) is provided illustrating a process for advocating a recommendation based on a trust evaluation. As shown, a set of recipients and recipient properties are received as input and assigned to the variable $X_{Total}$ (502). In addition, a set of action motivations are received together with their contribution to an action-based trust measurement (504). A set of one or more messages are identified for recommendation transmission to one or more recipients (506). In one embodiment, the one or more messages are set by subject matter. Following step (506), a trust measurement is computed for each identified possible recipient$_X$ from X=1 to $X_{Total}$, (508), with the computation based on one or more properties of the recipient or intended recipient, one or more properties of the message(s), and one or more action motivations and their contributions. Following the computations at step (508), the recipients or intended recipients are ranked based on their trust measurement scores (510). A sub-set of recipients are selected from the ranking (512), and the message(s) are sent to each recipient member of the sub-set (514). In one embodiment, the sub-set represents a set of recipients less than the entirety of recipients, and in another embodiment, the sub-set represents all of the recipients. In one embodiment, the identification of the sub-set of recipients supports accuracy of communication, so that the message is only transmitted to recipients identified in the sub-set. Such accuracy of communication, may also increase a marketing response rate, and may further increase revenue for a variety of marketing applications. Accordingly, as shown herein, the trust evaluations in the form of trust measurement is employed to identify and engage an intended or appropriate recipient who has been pre-evaluated to react favorably to receipt of the message.

Figure 6:
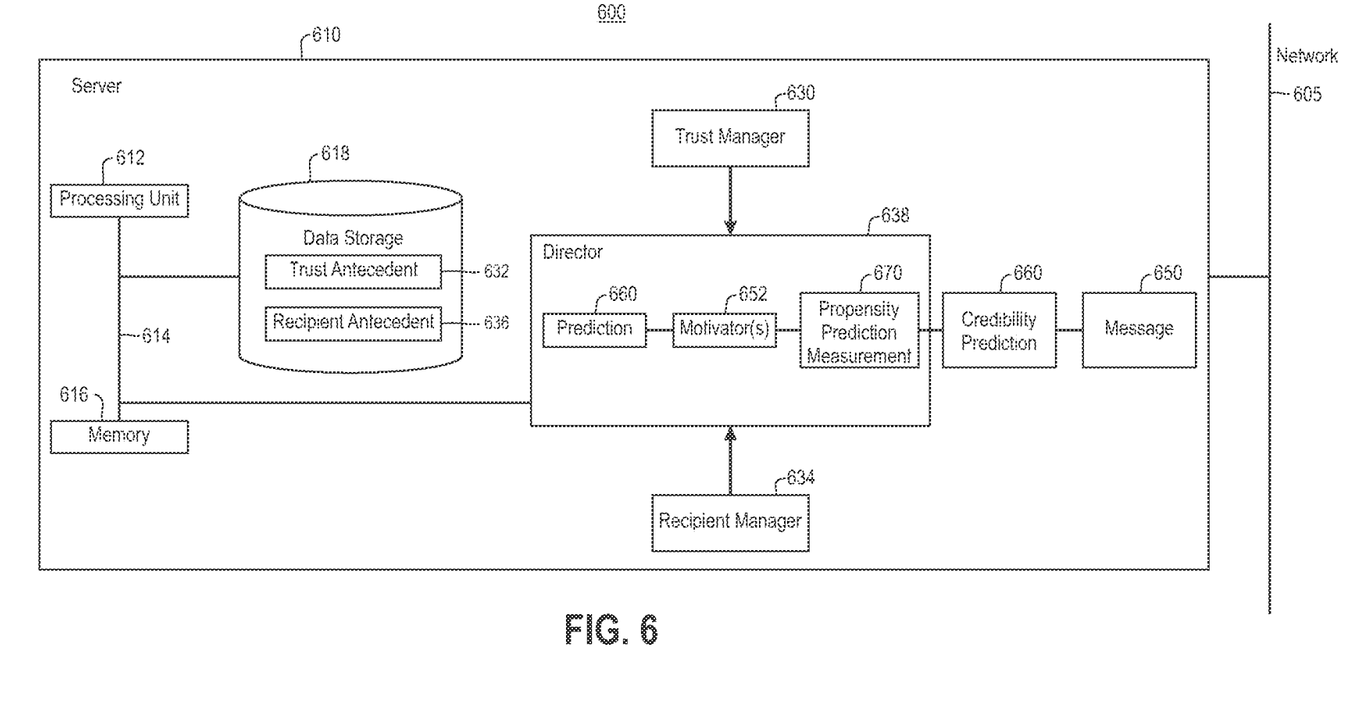
FIG. 6 depicts a block diagram illustrating components embedded in a computer system to support prediction of action propensity according to an embodiment of the invention.

Referring to FIG. 6, a block diagram (600) is provided illustrating components embedded in a computer system to build a predictive model of action propensity, and use of the model. As shown, a server (610) is provided with a processing unit (612) in communication with memory (616) across a bus (614), and in communication with data storage (618). The server (610) is in communication with one or more computing entities across a network connection (605). The server (610) is provided with tools to support and enable predicting action propensity in response to or associated with a received message (650). The tools include, but are not limited to, a trust manager (630), a recipient manager (634), and a director (638). The trust manager (630) functions to compute a trust antecedent (632) from a message. The trust antecedent (632) is shown and described in Table 2. In one embodiment, the trust manager (630) assigns a numerical value to each trust antecedent (632). The recipient manager (634) functions to compute a recipient antecedent (636) from recipient social media information. In one embodiment, the recipient antecedent (636) includes data associated with the recipient, such as prior knowledge on a subject of the message, and/or influences on the recipient from a social circle. The server (610) may utilize the network connection (605) to gather data pertaining to the message recipient. Both the computed trust antecedent (632) and the recipient antecedent (636) are shown stored in the data storage (618). In one embodiment, one or both of the trust antecedent (632) and the recipient antecedent (636) may be stored on remote data storage (not shown) or at a remote data center (not shown) accessible via shared resource, e.g. cloud based storage.

Both the trust manager (630) and the recipient manager (634) are in communication with the director (638), which is responsible for computation of trust measurement for the message. More specifically, the director (638) combines output (632) and (636) from both managers (630) and (634), respectively. It is the combination and the manner in which the output is combined that returns a perception of credibility prediction (660) towards the message (650). The recipient manager (634) computes at least one motivator (652) associated with the message (650), and the director (638) combines the prediction (660) and the motivator(s) (652) to return an action propensity prediction measurement (670). In one embodiment, the computation of the motivator (652) includes computing a factor of information associated with the message recipient, including at least one past behavior record related to the message, and/or thinking style regarding cost and benefit of the extracted action(s). In one embodiment, the action propensity measurement (670) is a sum of available actions advocated by the received message (650) weighted by an importance associated with these actions. Similarly, in one embodiment, the action propensity measurement (670) includes a personality trait factor of the recipient. Accordingly, the returned measurement (670) directly correlates to trustworthiness of the received message (650).

The server described above in FIG. 6 has been labeled with tools in the form of managers (630) and (634), and a director (638), hereinafter referred to as tools. The tools (630), (634), and (638) are shown as software tools in communication with memory (616) and the processing unit (612). Although in one embodiment, the tools (630, (634), and (638) may reside as hardware components. In another embodiment, the tools (630), (634), and (638) may be implemented as a combination of hardware and software. Similarly, in one embodiment, the tools (630), (634), and (638) may be combined into a single functional item that incorporates the functionality of the separate items. As shown herein, each of the tools (630), (634), and (638) are shown local to the server (610). However, in one embodiment they may be collectively or individually distributed across a shared pool of configurable computer resources and function as a unit to support trust modeling. Accordingly, the tools may be implemented as software tools, hardware tools, or a combination of software and hardware tools.

Furthermore, the described features, structures, or characteristics may be combined in any suitable manner in one or more embodiments. Examples of tools have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The tools (630), (634), and (638) may be implemented in programmable hardware devices such as field programmable gate arrays, programmable array logic, programmable logic devices, or the like. The tool(s) may also be implemented in software for processing by various types of processors. An identified tool of executable code may, for instance, comprise one or more physical or logical blocks of computer instructions which may, for instance, be organized as an object, procedure, function, or other construct. Nevertheless, the executable of an identified tool need not be physically located together, but may comprise disparate instructions stored in different locations which, when joined logically together, comprise the tools and achieve the stated purpose of the tools.

Indeed, a module of executable code could be a single instruction, or many instructions, and may even be distributed over several different code segments, among different applications, and across several memory devices. Similarly, operational data may be identified and illustrated herein within the module, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 7:
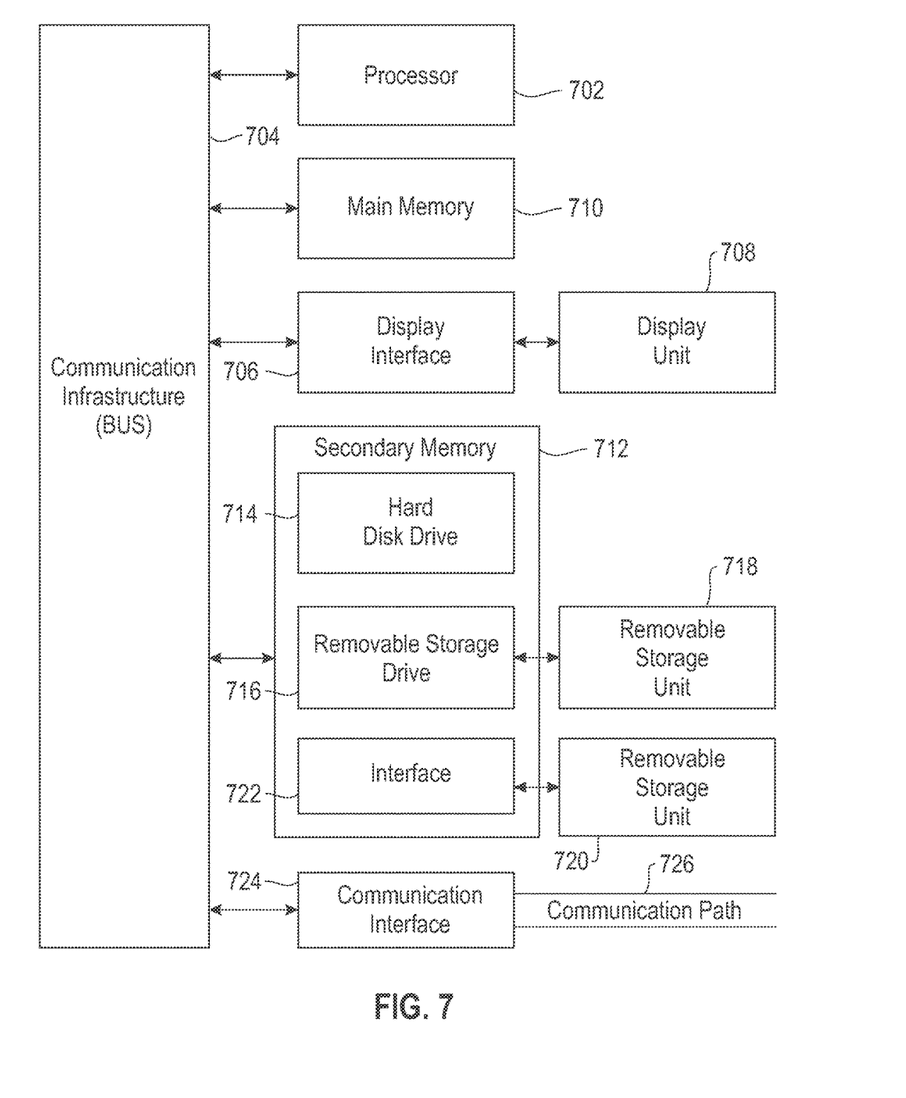
FIG. 7 depicts a block diagram of a computing environment according to an embodiment of the present invention.

Referring now to the block diagram of FIG. 7, additional details are now described with respect to implementing an embodiment of the present invention. The computer system includes one or more processors, such as a processor (702).

The processor (702) is connected to a communication infrastructure (704) (e.g., a communications bus, cross-over bar, or network).

The computer system can include a display interface (706) that forwards graphics, text, and other data from the communication infrastructure (704) (or from a frame buffer not shown) for display on a display unit (708). The computer system also includes a main memory (710), preferably random access memory (RAM), and may also include a secondary memory (712). The secondary memory (712) may include, for example, a hard disk drive (714) and/or a removable storage drive (716), representing, for example, a floppy disk drive, a magnetic tape drive, or an optical disk drive. The removable storage drive (716) reads from and/or writes to a removable storage unit (718) in a manner well known to those having ordinary skill in the art. Removable storage unit (718) represents, for example, a floppy disk, a compact disc, a magnetic tape, or an optical disk, etc., which is read by and written to by removable storage drive (716).

In alternative embodiments, the secondary memory (712) may include other similar means for allowing computer programs or other instructions to be loaded into the computer system. Such means may include, for example, a removable storage unit (720) and an interface (722). Examples of such means may include a program package and package interface (such as that found in video game devices), a removable memory chip (such as an EPROM, or PROM) and associated socket, and other removable storage units (720) and interfaces (722) which allow software and data to be transferred from the removable storage unit (720) to the computer system.

The computer system may also include a communications interface (724). Communications interface (724) allows software and data to be transferred between the computer system and external devices. Examples of communications interface (724) may include a modem, a network interface (such as an Ethernet card), a communications port, or a PCMCIA slot and card, etc. Software and data transferred via communications interface (724) is in the form of signals which may be, for example, electronic, electromagnetic, optical, or other signals capable of being received by communications interface (724). These signals are provided to communications interface (724) via a communications path (i.e., channel) (726). This communications path (726) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (710) and secondary memory (712), removable storage drive (716), and a hard disk installed in hard disk drive (714).

Computer programs (also called computer control logic) are stored in main memory (710) and/or secondary memory (712). Computer programs may also be received via a communication interface (724). Such computer programs, when run, enable the computer system to perform the features of the present invention as discussed herein. In particular, the computer programs, when run, enable the processor (702) to perform the features of the computer system. Accordingly, such computer programs represent controllers of the computer system.

The present invention may be a system, method, and/or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The implementation of the modeling identifies proper and/or intended recipients of a message or communication. This is beneficial as it enables system to identify and engage the right audience, increase marketing response rate, and in one embodiment, may increase revenue for a variety of marketing applications. Accordingly, the implementation of action based modeling produces a tangible output in the form of trust measurement as a characteristic of the message.

Alternative Embodiment

It will be appreciated that, although specific embodiments of the invention have been described herein for purposes of illustration, various modifications may be made without departing from the spirit and scope of the invention. In particular, an alternative implementation of the trust measurement may compute an action propensity from identified factors and antecedents. Such alternative implementations may involve extracting factors and antecedents involving a different spirit. Accordingly, the scope of protection of this invention is limited only by the following claims and their equivalents.

We claim:

1. A method comprising:
computing a trust antecedent from a message;
for each intended recipient of at least two intended recipients of the message, computing a recipient antecedent from recipient social media information;
combining the computed trust antecedent and computed recipient antecedent, and predicting a perception of credibility towards the message with the combined antecedents;
extracting one or more motivators from one or more message recipients;
returning an action propensity prediction measurement from the extracted motivator as a trust measurement for the message, the prediction measurement including a combination of the predicted perception of credibility and the extracted motivator;
ranking the at least two intended recipients of the message based on the returned prediction measurement; and
identifying a message recipient based on the ranking, and transmitting the message to the identified recipient.

2. The method of claim 1, wherein the action propensity is a sum of available actions advocated by the message weighted by an importance of the actions.

3. The method of claim 1, wherein the computation of the trust antecedent includes computing a characteristic of the message selected from the group consisting of: source of the message, a form of the message, an authority of the message, and combinations thereof.

4. The method of claim 1, wherein the computation of the recipient antecedent includes computing a characteristic selected from the group consisting of: prior knowledge on a subject of the message, influences from an associated social circle, and combinations thereof.

5. The method of claim 1, wherein the extraction of the one or more motivators includes computing a factor selected from the group consisting of: one or more past behavior records related to the message, thinking style regarding cost and benefit of one or more actions extracted from available recipient information, and combinations thereof.

6. The method of claim 1, further comprising factoring a personality trait of the recipient.

7. The method of claim 1, wherein the message transmission is limited to the identified message recipient.

8. A computer program product for predicting action propensity, the computer program product comprising a computer readable storage device having program code embodied therewith, the program code executable by a processing unit to:
compute a trust antecedent from a message;
for each intended recipient of at least two intended recipients of the message, compute a recipient antecedent from recipient social media information;
combine the computed trust antecedent and computed recipient antecedent, and predict credibility perception towards the message with the combined antecedents;
extract at least one motivator from one or more message recipients;
return an action propensity prediction measurement as a trust measurement for the message, the prediction measurement including a combination of the predicted perception of credibility and the extracted motivator;
rank the at least two intended recipients of the message based on the returned prediction measurement; and
identify a message recipient based on the ranking for receipt of the message, and transmit the message to the identified recipient.

9. The computer program product of claim 8, wherein the action propensity is a sum of available actions advocated by the message weighted by an importance of the actions.

10. The computer program product of claim 8, further comprising code to compute the trust antecedent, including assigning a numerical value to each trust antecedent.

11. The computer program product of claim 8, wherein the computation of the recipient antecedent includes data from available recipient information, including a characteristic selected from the group consisting of: prior knowledge on a subject of the message, influences from an associated social circle, and combinations thereof.

12. The computer program product of claim 8, wherein the extraction of the one or more motivators includes computing a factor selected from the group consisting of: one or more past behavior records related to the message, thinking style regarding cost and benefit of one or more actions extracted from available recipient information, and combinations thereof.

13. The computer program product of claim 8, further comprising program code to factor a personality trait of the recipient.

14. A computer system comprising:
a processing unit operatively coupled to memory;
a tool in communication with the processing unit to predict action propensity, including:
a trust manager to compute a trust antecedent from a message;
a recipient manager to compute, for each intended recipient of at least two intended recipients of the message, a recipient antecedent from recipient social media information;
a director in communication with the trust manager and the recipient manager, the director to combine the computed trust antecedent and computed recipient antecedent, and to predict a perception of credibility towards the message with the combined antecedents;
the recipient manager to extract one or more motivators from one or more message recipients;
an action propensity prediction measurement returned to the director from the recipient manager as a trust measurement for the message, the prediction measurement including a combination of the predicted perception of credibility and the extracted motivator;
the recipient manager to rank the at least two intended recipients of the message based on the returned prediction measurement and identify a message recipient; and
transmit the message to the intended recipient based on the ranking.

15. The system of claim 14, wherein the action propensity is a sum of available actions advocated by the message weighted by an importance of the actions.

16. The system of claim 14, further comprising the trust manager to compute the trust antecedent, including assigning a numerical value to each trust antecedent.

17. The system of claim 14, wherein the computation of the recipient antecedent includes data from available recipient information, including a characteristic selected from the group consisting of: prior knowledge on a subject of the message, influences from an associated social circle, and combinations thereof.

18. The system of claim 14, wherein the extraction of the one or more motivators includes computation of a factor selected from the group consisting of: one or more past behavior records related to the message, thinking style regarding cost and benefit of one or more actions extracted from available recipient information, and combinations thereof.

19. The system of claim 14, further comprising the director to include a personality trait of the recipient with the action propensity prediction measurement, the inclusion to improve prediction accuracy.

* * * * *